3,494,741
SWEET/BITTER CHEMORECEPTOR
Frank R. Dastoli, Burlington, Mass., and Steven Price, Richmond, Va., assignors to Monsanto Company, St. Louis, Mo., a corporation of Delaware
No Drawing. Filed June 26, 1967, Ser. No. 649,040
Int. Cl. G01n *33/00*
U.S. Cl. 23—230                                11 Claims

ABSTRACT OF THE DISCLOSURE

A method of chemically determining sweetness or bitterness by the use of protein fractions extracted from mammalian tongue epithelium which form complexes with sugars, artificial sweeteners and bitter substances. The strength of the complexes are related to the sweetness/bitterness of the compound. The relative taste of the compound is determined by comparing the refractive index of the complex against the known standard. The protein fractions appear to consist of a major component comprising about 75 percent of the total, with a molecular weight of the sweet complexing one of 150,000 and the bitter complexing one 166,000. The sweet sensitive fraction is cationic in nature and the bitter sensitive fraction neutral in charge.

BACKGROUND OF THE INVENTION

This invention relates to a simple method for determining the sweetness/bitterness of a compound by complexing the compound with a protein fraction derived from mammal tongue epithelium.

In higher animals, a chemoreceptor system exists which is responsible for the sense of taste (gustation). While electrophysiological studies have firmly established the location on the tongue of taste buds responding to sweet, sour, salty and bitter substances, our understanding of the biochemistry of taste is rudimentary. Attempts to correlate the taste of various compounds with their chemical structures or physical properties have met with only limited success. The nature of the initial interaction between taste stimuli and taste receptor has been the subject of considerable speculation, see L. M. Beidler, J. Gen. Physiol. 38, 133 (1954).

SUMMARY OF THE INVENTION

Applicants have now found a practical yet convenient means of determining the relative sweetness/bitterness of a compound. In accordance with this invention there is provided a method for determining sweetness/bitterness comprising reacting a substance of unknown sweetness/bitterness with protein fractions of mammalian taste buds and determining the strength of the complex formed, e.g., the refractive index value of the reaction mixture and comparing the value obtained against the known standard to determine the relative sweetness/bitterness.

DESCRIPTION OF THE PREFERRED EMBODIMENT

The mammalian taste buds protein fraction is obtained by removing the epithelium of the tongue from areas electrophysiologically mapped and reported in the literature to have the desired sweetness or bitterness quality, from all of the connective tissue of the tongue. The obtained epithelium is then homogenized with water at about pH 7.0 until a very fine homogenate is obtained. The resulting fine homogenate is then centrifuged for a few minutes, 15 minutes is suitable, at 1500×gravity. The resulting supernate is then decanted and recentrifuged for a longer period of time, 30 minutes being suitable, at 20,000 ×gravity. The supernate is again decanted and recentrifuged for a still longer period of time and at higher speeds, 60 minutes at 75,000×gravity being suitable.

The supernate from the third and final centrifugation is then decanted and transferred to a reaction vessel to which is gradually added sufficient ammonium sulfate until a 20 percent ammonium sulfate solution is obtained. The resulting ammonium sulfate solution is then stirred for a period of about 1 to 24 hours while being maintained at a temperature from about 0 to 10 degrees centigrade. Preferably the solution is stirred for at least 4 hours since shorter periods of time result in 25–30 percent lower yields. Stirring overnight at 4 degrees centigrade is a suitable schedule. The resulting solution is then centrifuged, 30 minutes at 20,000×gravity being suitable. The resulting sediment is hereinafter referred to as the 20 percent ammonium sulfate fraction.

The supernate is then brought to 40 percent ammonium sulfate and is again stirred and centrifuged as above. The sediment thus obtained is identified as the 40 percent ammonium sulfate fraction. After obtaining the 40 percent ammonium sulfate fraction the resulting supernate was brought to 60 percent ammonium sulfate and the same sequence of stirring and centrifuging followed to obtain the 60 percent ammonium sulfate fraction.

The preparation of the protein fraction is more conveniently carried out when the taste buds utilized are either bovine, equine or porcine although the tongues of other mammals may be used. It will be at once recognized that the largest groups of mammals generally slaughtered for their meat values are the bovine, and porcine groups of mammals.

The bitterness of a compound is most satisfactorily determined when the protein fraction employed is the 60 percent ammonium sulfate fraction of the bitter sensitive back tongue epithelium tissue. Sweetness on the other hand is more conveniently determined by the use of the 40 percent ammonium sulfate fraction of the sweet sensitive tongue tip epithelium.

From the foregoing preparation scheme it will readily be seen that the processing of one tongue at a time is not a practical unit of material. A convenient unit of material in dealing with bovine tongues is about five tongues while when dealing with the porcine the unit is about fifteen tongues and for specie having smaller tongues the corresponding number of tongues would be greater. The simultaneous processing of a number of tongues at one time has an additional advantage in that the protein fraction prepared will have a consistent and reproducible test result. The use of a protein fraction derived from a single tongue produces preparations of varying sensitivity and selectivity and can produce erratic results with respect to a series of test results.

In the process of this invention it is convenient to maintain the protein fraction of the mammalian taste buds at the concentration obtained by the centrifuge treatment, which is approximately 20 milligrams of sediment per milliliter. The concentration of the substance undergoing testing will vary from an aqueous solution of 1 molar downwards to the minimum molar amount which will produce a detectable response. When physical characteristic (or physical property being varied) measured is the refractive index of the reaction mixture the lower molar amount is approximately 1/100th to 1/1000th depending on the sweetness/bitterness of the compound.

Satisfactory results are obtained even though the pH of the protein fraction of the mammalian taste buds is varied over a wide range. However, it is preferable that the pH be at least 5.5 to achieve greater uniformity of results.

The bovine sweet-sensitive protein fraction is characterized by a purity of 85 percent as judged by molecular sieve and ion exchange chromatography, thin layer and disc electrophoresis and ultracentrifugation; by use of these same techniques plus amino acid analysis and potentiometric titration the protein is noted as highly cationic, pI 9.1–9.8; about 150,000 in molecular weight; high in the amino acid lysine and having a hexose-hexosamine of less than 12 percent as determined colorimetrically.

The porcine bitter-sensitive muco-sialoprotein fraction when judged as above is about 90 percent plus purity. By use of the same techniques plus amino acid analysis the protein fraction has been determined to be neutral in charge. pI 7.3; with a molecular weight of about 166,000; a hexose-hexosamine content of 33 percent and a high (about 20 percent) sialic acid content.

The relative sweetness/bitterness of a test material can be readily determined by the use of the mass action law. As applied to the reaction mixture of the mamalian taste bud protein fraction and unknown the law may be stated as $$\frac{C}{R} = \frac{C}{Rm} + \frac{1}{KRm}$$

wherein C is the concentration of the chemical stimulus, i.e. the test compound, R is equal to the magnitude of the response, $Rm$ is equal to the maximum response and K is an equilibrium constant. In each case solving of the equation for K gives the relative sweetness/bitterness of the chemical stimuli test compound. The various values of K may be compared directly to obtain the relative sweetening/bitterness quality of an unknown chemical stimuli or to determine the amount of sweetness/bitterness of a compound with respect to the amount of sweetness/bitterness desired for that particular system.

The complexing strength or amount of reaction between the substance to be tested and the taste bud fraction may be determined by several different chemical analytical methods. In each case values are obtained for C, R and $Rm$ in the above formula and K is then calculated. Useful analytical techniques include ultraviolet spectroscopy, refractive index and column-gass chromatography. As between ultraviolet spectroscopy and refractive index methods the latter is much more convenient since (1) no scale expansion, as is necessary in ultraviolet spectroscopy, is needed to detect the small changes upon interaction; (2) very small amount of the taste bud protein fraction is needed for each assay; and (3) ultraviolet absorbing materials and other non-specific ultraviolet perturbing agents do not interfere. As between the refractive index method and the column-gas chromatography the former method is simple and rapid while the latter though requiring more complex equipment is capable in determining the small changes upon interaction when the unknown is present in extremely low molar amounts.

This invention provides a convenient method of determining the sweetness/bitterness of foods, confectionaries, drug stocks and the like and an accurate means of adjusting or correcting these goods to the desired sweetness/bitterness. Additionally this invention makes possible more precise formulation of flavors to achieve a desired result.

With knowledge of active sites of receptor proteins flavors can be designed incorporating specific functional groups that will complex with their active sites and stimulate specific taste qualities, i.e. sweet. With such knowledge flavors can also be designed as analogs that would bind to specific sites but not stimulate the taste response. Such design would effectively mask an unwanted taste quality, i.e. bitter.

The following examples are illustrative of the invention. In each of the examples unless otherwise specified all parts are by weight and all degrees are degrees centigrade.

EXAMPLE 1

Bovine tongues obtained from a local slaughterhouse were used as the source of taste buds. Papillae from the tip and from the palate region of the tongue were dissected free of underlining muscle, broken up in a Waring Blendor, and homogenized further in a motor driven glass homogenizer in four volumes of 0.1 M phosphate buffer, pH 7.0. All operations were carried out at 4°±2° C. The resulting fine homogenate was centrifuged for 15 minutes at 1500×gravity; the resulting supernate was decanted and recentrifuged for 30 minutes at 20,000×gravity. The supernate was again decanted and recentrifuged for 60 minutes at 75,000×gravity. From this final centrifugation the supernate was decanted and transferred into a 2-liter beaker. Ammonium sulfate was gradually added until a 20 percent ammonium sulfate solution was obtained. The solution was stirred overnight at 4° C. and centrifuged the following day at 20,000×gravity for 30 minutes. The sediment was saved and labeled as a 20 percent ammonium sulfate fraction. The supernate was gradually brought to 40 percent ammonium sulfate and again stirred overnight. The pH of the solution at this step was 5.5. The solution was again centrifuged for 30 minutes at 20,000×gravity. The sediment was harvested and saved as the 40 percent ammonium sulfate fraction. Again protein was precipitated from the supernate by stirring overnight after gradual addition of sufficient ammonium sulfate to make a 60 percent ammonium sulfate solution. The following day this solution was centrifuged at 20,000×gravity for 30 minutes; the sediment harvested and saved as the 60 percent ammonium sulfate fraction.

A portion of the 40 percent ammonium sulfate beef tongue fraction was hydrolyzed in 6 N HCl at 100° C. for 18 hours in vacuo. The digest was subjected to an amino acid analysis, the results being tabulated Table I below. Ultracentrifugal analysis of the 40 percent ammonium sulfate fraction was performed. Protein concentration was 10.22 mg./ml. in 0.1 M phosphate buffer, pH 7.3. The rotor speed was gradually increased to 59,780 revolutions per minute and the sedimenting boundary was observed at 3, 9, 17, 37 and 71 minutes. Archibald determination for weight average molecular weight was run 8225 revolutions per minute at 5°. Average values assumed for proteins, $dx/dc=0.186$ and $V=0.740$ were used in the calculations. The protein was homogeneous for up to 37 minutes of the run. Thereafter it revealed at least one other component. A value of 2.69 S was obtained for the fast removing peak and 2.19 S for the slower. The molecular weight was calculated by the approach toward sedimentation equilibrium technique ot be 152,000. This is in fairly good accord with the minimal molecular weight 150,000 based on the data from molecular sieve studies.

TABLE I.—AMINO ACID COMPOSITION OF BEEF (TIP) TONGUE

| Amino Acid | Amino Acid Recovery [1] (μmoles) | Amino Acid Residue/ 100 grams of Protein (grams) | Minimal Molec. Weight [2] | Amino Acid per 150,000 grams of Protein (moles) | Nearest Integral No. of Amino Acid Residues for 150,000 grams of Protein | Intergral Nos. of X Residue Molec. Weigh. |
|---|---|---|---|---|---|---|
| Lysine | 0.212 | 9.05 | 1,414 | 106.00 | 106 | 13,568 |
| Histidine | 0.057 | 2.60 | 5,269 | 28.47 | 28 | 3,836 |
| Ammonia | 0.353 | [3] (1.65) | | [3] (176.78) | [3] (177) | [3] (2,478) |
| Arginine | 0.105 | 5.46 | 2,857 | 52.50 | 53 | 8,268 |
| Aspartic Acid | 0.261 | 10.00 | 1,150 | 130.43 | 130 | 14,950 |
| Threonine | 0.154 | 5.18 | 1,949 | 76.93 | 77 | 7,777 |
| Serine | 0.175 | 5.07 | 1,716 | 87.41 | 87 | 7,569 |
| Glutamic Acid | 0.385 | 16.55 | 779 | 192.44 | 192 | 24,768 |
| Proline | 0.208 | 6.72 | 1,443 | 103.90 | 104 | 10,088 |
| Glycine | 0.207 | 3.93 | 1,450 | 103.42 | 103 | 5,871 |
| Alanine | 0.180 | 4.26 | 1,667 | 90.00 | 90 | 6,390 |
| ½-Cystine | 0.033 | 1.12 | 9,107 | 16.47 | 16 | 1,632 |
| Valine | 0.202 | 6.66 | 1,486 | 100.90 | 101 | 9,999 |
| Methionine | 0.040 | 1.74 | 7,528 | 19.92 | 20 | 2,620 |
| Isoleucine | 0.115 | 4.33 | 2,609 | 57.48 | 57 | 6,441 |
| Leucine | 0.221 | 8.33 | 1,356 | 110.57 | 111 | 12,543 |
| Tyrosine | 0.071 | 3.86 | 4,222 | 35.52 | 36 | 5,868 |
| Phenylalanine | 0.090 | 4.41 | 3,333 | 45.00 | 45 | 6,615 |
| Total | | 100.92 | | | 1,533 | 148,803 |

[1] The values are expressed as micromoles of amino acid per 0.3 mg. of protein.
[2] Calculated from the relationship (amino acid residue molec. wt.)×100/percent of amino acid residue in protein.
[3] This number is omitted from the total.

EXAMPLE 2

Using the general preparative scheme of Example 1 a 60 percent porcine bitter sensitive protein fraction was prepared. The back epithelium of the tongues of 15 pigs (bitter quality portion) was removed and scraped clean of all connective tissue. A total of 164 grams of tissue was obtained. Afer homogenizing and centrifuging at 75,000×gravity, 1160 ml. of supernate was transferred into a two-liter beaker. The supernate was successively treated with 20, 40 and 60 percent ammonium sulfate to obtain the various fractions. A yield of 622 mg. of 60 percent ammonium sulfate fraction was obtained. This fraction was dialyzed overnight against three liters of distilled, deionized water at 4° C. The dialyzed protein was then lyophilized.

Molecular weight of the 60 percent fraction was determined by molecular sieve chromatography. Spherical polyacrylamide gels (Bio-Gel P-150, Bio-Rad Lab, 50–150 mesh) with an exclusion limit of molecular weight 150,000 and a reported operating range of 50,000–150,000 (actual range 14,000 to 186,000) was the resin of choice. The column was 2.5×37 centimeters with a flow rate of 1.5 ml. per minute/cm.$^2$; the eluant was 0.01 M phosphate buffer pH 7.0; load was 20 mg. 60 percent ammonium sulfate fraction of the porcine back tongue dissolved in 2.0 ml. phosphate buffer, 0.01 M, pH 7.0. Fractions of 5 ml. were collected and the presence of protein was determined by following absorbance at 280 mμ. In addition, model reference proteins over a wide range of molecular weights (14,000–186,000) were passed through the column under identical conditions in order to better approximate the molecular weight of the newly isolated protein. The results are tabulated below in Table II.

TABLE II.—MOLECULAR WEIGHTS AND THE RATIOS OF ELUTION VOLUME TO COLUMN VOID VOLUME OF SOME PROTEINS

| Proteins | Lit. Values of Mol. Wt. | V/V$_0$ | Calcd. Mol. Wt. |
|---|---|---|---|
| Lysozyme | 14,700 | 2.672 | 12,500 |
| α-Chymotrypsin | 22,500 | 2.410 | 22,180 |
| Pepsin | 35,500 | 2.190 | 33,960 |
| Bovine Serum Albumin | 69,000 | 1.875 | 71,610 |
| Alcohol Dehydrogenase (yeast) | 150,000 | 1.540 | 152,100 |
| 60%-Pig Back-Part of Tongue | | 1.500 | 166,000 |
| Glucose Oxidase | 186,000 | 1.458 | 181,600 |

EXAMPLE 3

Determination of the sweetness value of a 1 molar solution of sucrose follows. All experimental data were an average of three determinations performed on a Bausch and Lomb Abbe–3L refractometer thermostated at 25±0.01°. The refractive index of the 40 percent ammonium sulfate bovine protein fraction (0.05 ml.+0.05 ml. water) was determined to be 1.3420 while the refractive index of water was 1.3300 for a difference of 0.0120 due to the bovine protein fraction. The refractive index of a 1 molar aqueous solution of glucose was 1.3800. The theoretical refractive index for the above 40 percent ammonium sulfate bovine protein fraction plus the 1 molar glucose fraction is 1.3800+0.012 for a total of 1.3920 whereas the observed value for the solution was 1.3903, a difference of 0017.

EXAMPLE 4

In a manner similar to Example 3 the K value for various sweet compounds was determined by the method of this invention and also compared against published in vivo test results. The results are tabulated in Table III below.

TABLE III.—RESPONSE OF BOVINE TASTE BUD FRACTION TO SWEET COMPOUNDS DETERMINED BY REFRACTIVE INDEX METHOD

| Compound | Rm[a] | K (1 mole$^{-1}$) | Relative In Vivo Sweetness | | | |
|---|---|---|---|---|---|---|
| Fructose | 0.0016 | 1,030 | [1] 1 | [1] 1 | [1] 1 | [1] 1 |
| Sucrose | 0.0008 | 85 | 2 | 2 | 2 | 2-3 |
| Glucose | 0.0017 | 27 | 3 | 3 | 3 | 4 |
| Galactose | 0.0007 | 10 | 4 | | | 5 |
| Mannose | 0.0009 | 35 | | | | 2-3 |
| Saccharin | 0.0011 | 226 | | | | |

[a] Data are in refractive index units.
[b] A. Biester, M. W. Wood and C. S. Wahlin. Amer. J. Physiol. 73, 387 (1925).
[c] F. W. Fabian and H. B. Blum. Food Res. 8, 179 (1943).
[d] C. F. Walton, Jr. In: International Critical Tables of Numerical Data, Physics, Chemistry and Technology. E. W. Washburn, ed. National Research Council of the U.S.A. McGraw-Hill, New York (1926).
[e] H. T. Anderson, M. Funakoshi and Y. Zotterman. In: Olfaction and Taste. Y. Zotterman, ed. MacMillan and Co., New York. pp. 177–192 (1963).

EXAMPLE 5

Following the procedure of Example 3 but using the indicated porcine fractions additional compounds were rated for their sweetness or bitterness. The values are tabulated below.

TABLE IV.—RESPONSE OF PORCINE TAST BUD FRACTION TO SWEET AND BITTER COMPOUNDS DETERMINED BY REFRACTIVE INDEX METHOD

| Compound | 20% (NH$^4$)$^2$SO$^4$ Tongue Tips R | 40% (NH$^4$)$^2$SO$^4$ Tongue Back R | 60% (NH$^4$)$^2$SO$^4$ Tongue Back R |
|---|---|---|---|
| Fructose | .0009 | .0001 | .0000 |
| Galactose | .0009 | .0002 | .0002 |
| Glucose | .0010 | .0001 | .0002 |
| Sucrose | .0012 | .0001 | .0001 |
| Quinine | .0002 | .0008 | .0015 (.045M) |
| | | | .0004 (.0075M) |
| | | | .0001 (.0045M) |
| Caffeine | .0000 | .0004 | .0003 (0.10M) |
| | | | .0006 (0.05M) |

The foregoing examples and methods have been described in the foregoing specification for the purpose of illustration not limitation. Many other modifications and ramifications will naturally suggest themselves to those skilled in the art based on this disclosure. These are intended to be comprehended within the scope of this invention.

Having thus described our invention, what we desire to claim and secure by Letters Patent is:

1. A method for determining sweetness/bitterness comprising reacting a substance of unknown sweetness/bitterness with a protein fraction of mammalian taste buds and comparing the resulting physical test data of the reaction mixture against a known standard to determine a relative sweetness/bitterness.

2. The method according to claim 1 wherein the refractive index value of the reaction mixture is compared against a known standard.

3. The method of claim 2 wherein the mammalian taste buds employed are bovine.

4. The method according to claim 2 wherein the mammalian taste buds are porcine.

5. The method according to claim 2 for determining sweetness wherein the taste bud protein is soluble in a 20 percent aqueous ammonium sulfate solution and insoluble in a 40 percent ammonium sulfate solution.

6. The method according to claim 2 for determining bitterness wherein the taste bud muco-sialoprotein is soluble in a 40 percent aqueous ammonium sulfate solution and insoluble in a 60 percent ammonium sulfate solution.

7. The method according to claim 2 wherein the pH of the reaction is at least 5.5.

8. The process according to claim 2 wherein the taste bud fraction is prepared by homogenizing mammalian taste buds substantially free of connective tissue at about neutral pH, centrifuging the homogenate, precipitating taste bud proteins from the resulting supernate with ammonium sulfate, centrifuging the resulting solution, decanting the supernate and repeating precipitation from the supernate with a more concentrated solution of ammonium sulfate until the desired precipitate is obtained.

9. The method according to claim 2 for determining sweetness comprising reacting a substance of unknown sweetness with a protein fraction of mammalian taste buds soluble in a 20 percent ammonium sulfate solution and insoluble in a 40 percent ammonium sulfate solution at a pH of at least 5.5.

10. The method according to claim 2 for determining bitterness comprising reacting a substance of unknown bitterness with a muco-sialoprotein fraction of mammalian taste buds soluble in a 40 percent ammonium sulfate solution and insoluble in a 60 percent ammonium sulfate solution at a pH of at least 5.5.

11. A mammalian taste bud fraction prepared by homogenizing mammalian taste buds substantially free of connective tissue at about neutral pH, centrifuging the homogenate, precipitating taste bud proteins from the resulting supernate with ammonium sulfate, centrifuging the resulting solution, decanting the supernate and repeating precipitation from the supernate with a more concentrated solution of ammonium sulfate until the desired precipitate is obtained.

References Cited

Schutz et al., Chem. Abstr. 51, 16992a (1957).
Barnes et al., Chem. Abstr. 54, 19915i (1960).
Dastoli et al., Science 154, 905–907, November 1966.

MORRIS O. WOLK, Primary Examiner

R. M. REESE, Assistant Examiner

U.S. Cl. X.R.
260—112